US011653263B2

(12) United States Patent
Bathwal et al.

(10) Patent No.: US 11,653,263 B2
(45) Date of Patent: May 16, 2023

(54) PACKET COMPRESSION ENHANCEMENTS

(71) Applicant: QUALCOMM Incorporated, San Diego, CA (US)

(72) Inventors: Saket Bathwal, Hyderabad (IN); Deepak Sah, Hyderabad (IN); Leena Zacharias, San Jose, CA (US); Rudhir Varna Upretee, San Diego, CA (US); Gang Andy Xiao, San Diego, CA (US); Venukant Sahu, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 246 days.

(21) Appl. No.: 17/195,234

(22) Filed: Mar. 8, 2021

(65) Prior Publication Data
US 2022/0286906 A1 Sep. 8, 2022

(51) Int. Cl.
*H04W 28/06* (2009.01)
*H04W 28/02* (2009.01)
*H04W 72/1268* (2023.01)
*H04L 1/00* (2006.01)
*H04W 72/14* (2009.01)
*H04W 80/02* (2009.01)
*H04W 72/04* (2023.01)

(52) U.S. Cl.
CPC .......... *H04W 28/06* (2013.01); *H04L 1/0008* (2013.01); *H04W 28/0278* (2013.01); *H04W 72/042* (2013.01); *H04W 72/1268* (2013.01); *H04W 72/14* (2013.01); *H04W 80/02* (2013.01)

(58) Field of Classification Search
None
See application file for complete search history.

(56) References Cited

U.S. PATENT DOCUMENTS

2016/0142934 A1* 5/2016 Ahmadzadeh ........ H04W 28/06
370/328

FOREIGN PATENT DOCUMENTS

EP 2026617 A1 * 2/2009 ........... G03B 21/625

* cited by examiner

*Primary Examiner* — Alex Skripnikov
(74) *Attorney, Agent, or Firm* — Norton Rose Fulbright US LLP

(57) ABSTRACT

In one aspect, a method of wireless communication includes determining a number of bytes in a compressed queue and a number of bytes in an uncompressed queue. The method also includes transmitting a buffer status report (BSR) indicating at least the number of bytes in the compressed queue. The method includes receiving an uplink grant indicating one or more uplink grant resources and a number of bytes allocated for the one or more uplink grant resources. The method also includes generating a transport block (TB) based on the uplink grant and the BSR and from data of at least the compressed queue, wherein the TB includes one or more compressed packets and one or more uncompressed packets. The method further includes transmitting a PUSCH transmission including the TB during an uplink grant resource of the one or more uplink grant resources. Other aspects and features are also claimed and described.

30 Claims, 11 Drawing Sheets

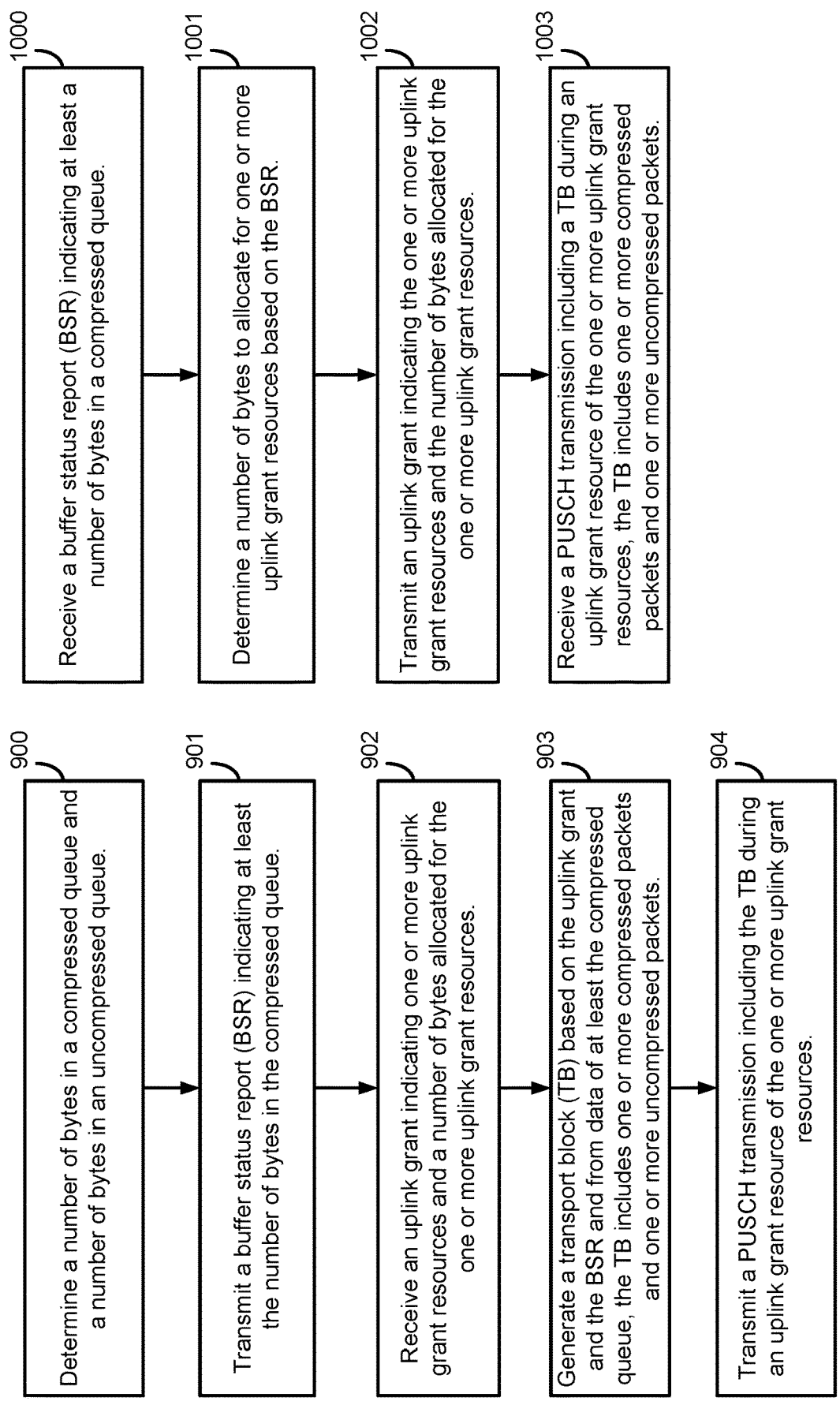

PACKET COMPRESSION ENHANCEMENTS

TECHNICAL FIELD

Aspects of the present disclosure relate generally to wireless communication systems, and more particularly, to packet compression. Certain embodiments of the technology discussed below can enable and provide reduced padding.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication includes determining, by a user equipment (UE), a number of bytes in a compressed queue and a number of bytes in an uncompressed queue; transmitting, by the UE, a buffer status report (BSR) indicating at least the number of bytes in the compressed queue; receiving, by the UE, an uplink grant indicating one or more uplink grant resources and a number of bytes allocated for the one or more uplink grant resources; generating, by the UE, a transport block (TB) based on the uplink grant and the BSR and from data of at least the compressed queue, wherein the TB includes one or more compressed packets and one or more uncompressed packets; and transmitting, by the UE, a PUSCH transmission including the TB during an uplink grant resource of the one or more uplink grant resources.

In an additional aspect of the disclosure, an apparatus configured for wireless communication is disclosed. The apparatus includes means for determining, by a user equipment (UE), a number of bytes in a compressed queue and a number of bytes in an uncompressed queue; means for transmitting, by the UE, a buffer status report (BSR) indicating at least the number of bytes in the compressed queue; means for receiving, by the UE, an uplink grant indicating one or more uplink grant resources and a number of bytes allocated for the one or more uplink grant resources; means for generating, by the UE, a transport block (TB) based on the uplink grant and the BSR and from data of at least the compressed queue, wherein the TB includes one or more compressed packets and one or more uncompressed packets; and means for transmitting, by the UE, a PUSCH transmission including the TB during an uplink grant resource of the one or more uplink grant resources.

In an additional aspect of the disclosure, a non-transitory computer-readable medium having program code recorded thereon. The program code further includes code to determine, by a user equipment (UE), a number of bytes in a compressed queue and a number of bytes in an uncompressed queue; transmit, by the UE, a buffer status report (BSR) indicating at least the number of bytes in the compressed queue; receive, by the UE, an uplink grant indicating one or more uplink grant resources and a number of bytes allocated for the one or more uplink grant resources; generate, by the UE, a transport block (TB) based on the uplink grant and the BSR and from data of at least the compressed queue, wherein the TB includes one or more compressed packets and one or more uncompressed packets; and transmit, by the UE, a PUSCH transmission including the TB during an uplink grant resource of the one or more uplink grant resources.

In an additional aspect of the disclosure, an apparatus configured for wireless communication is disclosed. The apparatus includes at least one processor, and a memory coupled to the processor. The processor is configured to determine, by a user equipment (UE), a number of bytes in a compressed queue and a number of bytes in an uncompressed queue; transmit, by the UE, a buffer status report (BSR) indicating at least the number of bytes in the compressed queue; receive, by the UE, an uplink grant indicating one or more uplink grant resources and a number of bytes allocated for the one or more uplink grant resources; generate, by the UE, a transport block (TB) based on the uplink grant and the BSR and from data of at least the compressed queue, wherein the TB includes one or more compressed packets and one or more uncompressed packets; and transmit, by the UE, a PUSCH transmission including the TB during an uplink grant resource of the one or more uplink grant resources.

In another aspect of the disclosure, a method of wireless communication includes determining, by a user equipment (UE), an estimated time for data compression; determining, by the UE, a maximum physical layer capacity and history information for previous uplink grants; determining, by the UE, a threshold number of packets to keep in a compressed queue based on the estimated time for data compression, the maximum physical layer capacity, and the history of uplink grants.

Other aspects, features, and embodiments will become apparent to those of ordinary skill in the art, upon reviewing the following description of specific, exemplary embodiments in conjunction with the accompanying figures. While features may be discussed relative to certain aspects and figures below, all embodiments can include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 9 is a flow diagram illustrating an example process that supports use of enhanced packet compression operations according to one or more aspects.

FIG. 10 is a flow diagram illustrating an example process that supports use of enhanced packet compression operations according to one or more aspects.

DETAILED DESCRIPTION

Figure 1:
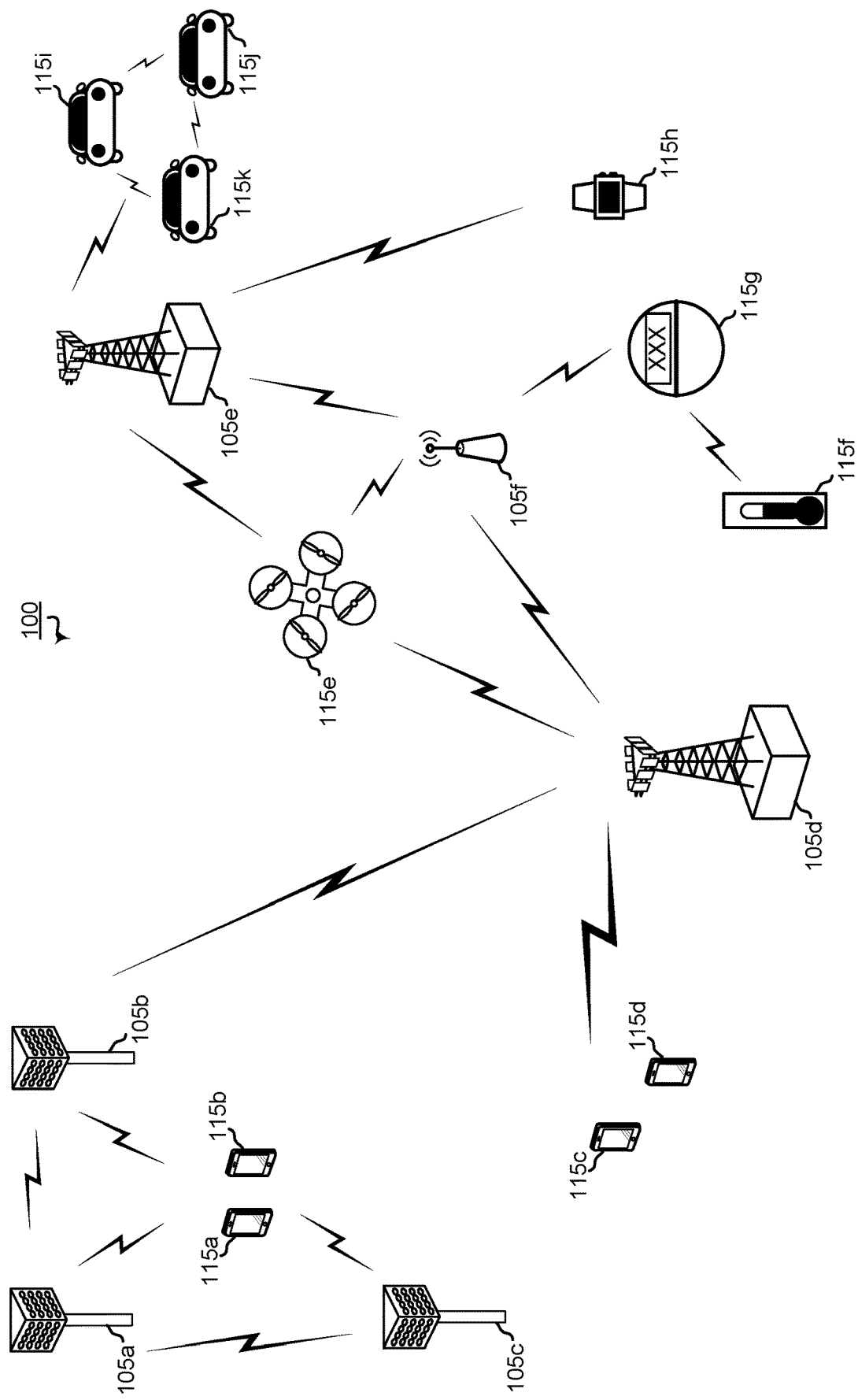
FIG. 1 is a block diagram illustrating details of a wireless communication system according to some embodiments of the present disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The Third Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. Additionally, an operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects descried with reference to one technology may be understood to be applicable to another technology. Indeed, one or more aspects of the present disclosure are related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 is a block diagram illustrating details of an example wireless communication system. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component device/module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink and/or uplink, or desired transmission between base stations, and backhaul transmissions between base stations. UEs may operate as base stations or other network nodes in some scenarios. Backhaul communication between base stations of wireless network 100 may occur using wired and/or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD/FDD communications, such as in a vehicle-to-vehicle (V2V) mesh network between UEs 115i-115k communicating with macro base station 105e.

Figure 2:
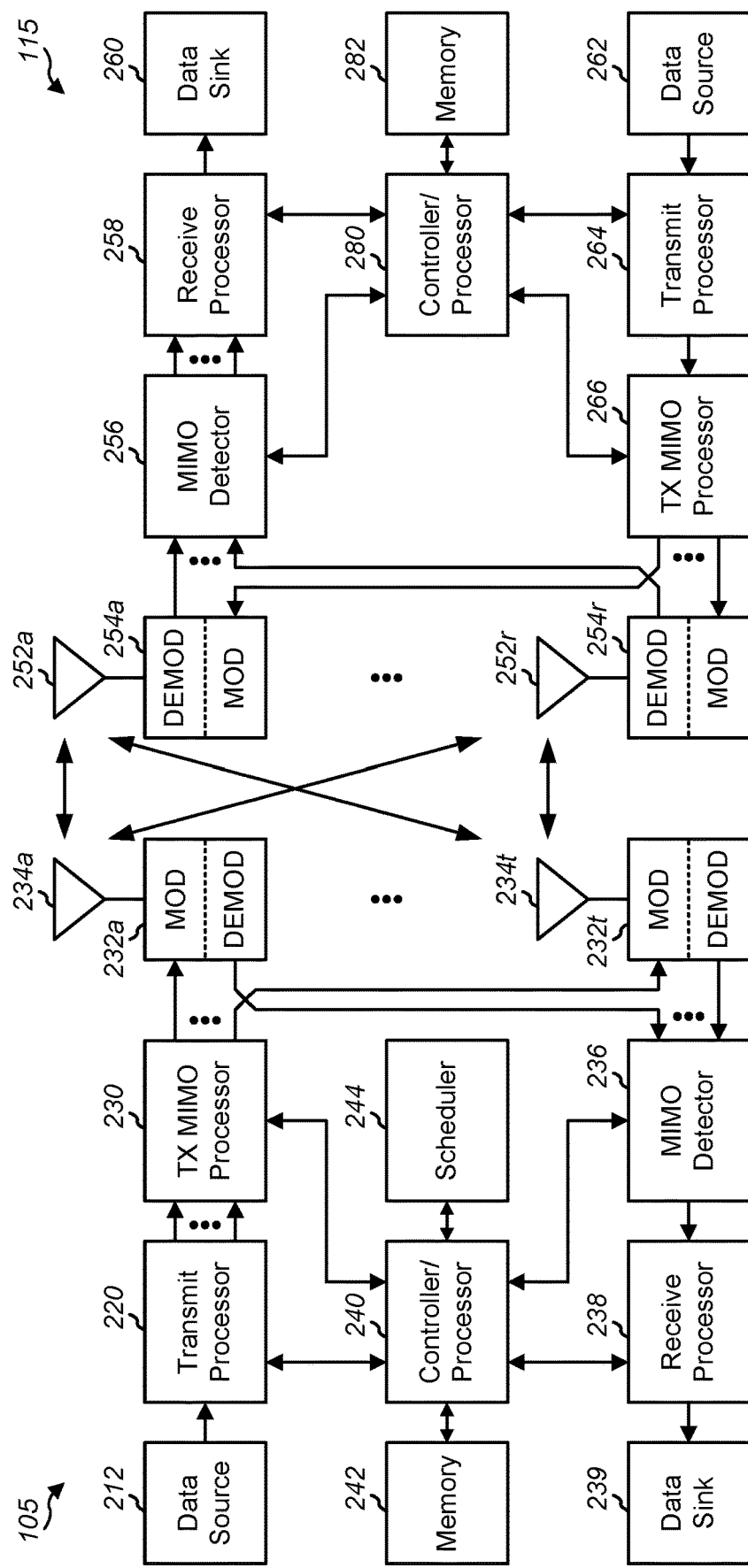
FIG. 2 is a block diagram conceptually illustrating a design of a base station and a UE configured according to some embodiments of the present disclosure.

FIG. 2 shows a block diagram conceptually illustrating an example design of a base station 105 and a UE 115, which may be any of the base stations and one of the UEs in FIG. 1. For a restricted association scenario (as mentioned above), base station 105 may be small cell base station 105f in FIG. 1, and UE 115 may be UE 115c or 115D operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, the antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller/processor 280.

On the uplink, at UE 115, transmit processor 264 may receive and process data (e.g., for the physical uplink shared channel (PUSCH)) from data source 262 and control information (e.g., for the physical uplink control channel (PUCCH)) from controller/processor 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 280 and/or other processors and modules at UE 115 may perform or direct the execution of various processes for the techniques described herein, such as to perform or direct the execution illustrated in FIGS. 9 and 10, and/or other processes for the techniques described herein. Memories 242 and 282 may store data and program codes for base station 105 and UE 115, respectively. Scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Packet compression can increase data transmission rates and bandwidth. However, compression of an uncompressed packet takes a few microseconds before it is ready to be sent over the air. Thus, in wireless communication systems compression had to be done "offline" because doing it online in real-time (e.g. on-the-fly) might cause a device (e.g., UE) to miss generating (e.g., building) a transport block. For example, attempting to perform compression after receiving an uplink grant, referred to as on-the-fly), may cause the UE to miss its window or timeline for UL transport block (TB) building for the uplink opportunity indicated by the uplink grant. A conventional solution for overcoming this issue is to have the UE maintain multiple separate queues (e.g., buffers) for different types of data, such as compressed and uncompressed queues. Such separate queues enable the UE to buffer both compressed packets and uncompressed packets and to send compressed data which has already been compressed and stored in the compressed queue. Accordingly, the UE will not miss generating a transmission (e.g., building a TB) by attempting to compress data for the transmission on-the-fly, such as after receiving a grant.

The UE may report buffer status information indicating queue/buffer details to a scheduling device, such as a base station. The UE may generate a buffer status report (BSR) indicating information about the compressed queue, or both the compressed and uncompressed queues. For example, the UE may indicate a capacity (e.g., 30 percent full or 70 percent empty) of a queue or an amount of data (e.g., bytes or packets) in a queue or queues.

The UE may transmit the BSR to the network to indicate it has data to transmit. The UE may then receive a grant and generate a transmission based on the grant. For example, the UE may receive a grant indicating X amount of information (bytes or packets), and the UE may build a TB from the compressed data in the compressed queue based on the grant and the X amount of information allotted. An example of such is illustrated and described in further detail in FIG. 3.

In implementations where the BSR only indicates compressed queue data, the BSR does not indicate uncompressed queue data (e.g., data waiting for compression). In such implementations, the UE does not report data which will be newly compressed when following grants are allocated to UE. This will result in UE not able to utilize peak physical (PHY) link capacity and achieve lower throughput. For example, the UE may be allocated less bits than it has available to send and may have to wait for an additional grant to send such data. To illustrate, the UE may have some newly compressed data to send that was compressed after generating/sending the BSR report and prior to receiving an uplink grant.

In implementations where the BSR indicates compressed and uncompressed queue data, the BSR may over report data to be sent because all of the reported uncompressed data may not get compressed during the transient state, such as in between generating/sending the BSR report and receiving an uplink grant. Additionally, even if the UE does manage to get all of the reported uncompressed data compressed and in the compressed queue before the uplink grant, the number of bytes in the compressed queue will be smaller due to compression than what was reported in the BSR. This may result in MAC padding to fill the unused capacity and reduce or prevent wasting of resources.

In the aspects described herein, the UE may build TBs with both compressed and uncompressed data. The UE may be able to build TBs with compressed and uncompressed data when sending BSRs which indicate compressed queue details or compressed and uncompressed queue details. For example, when the UE (or other transmitting device) reports data piled up in both compressed and uncompressed queue as BSR, the UE will start building the TB with compressed data (e.g., compressed packets) from the compressed queue and then will build the TB with uncompressed data (e.g., uncompressed packets) from the uncompressed queue. Such operations increase network utilization and reduce padding. To illustrate, ensure that while building TB packets with uncompressed profile are also sent once compressed queue is empty and the device still has grants to be utilized.

As another example, the UE (or other transmitting device) reports data piled up in the compressed queue only. However, in such implementations, the UE (or other transmitting device) may store both compressed data and uncompressed data in the compressed queue. Thus, in such implementations the transmitting device reports compressed data and uncompressed data waiting to be sent. The amount of compressed data, the amount of uncompressed data, or both, to store in the compressed queue may be determined based on one or more threshold values. Such threshold values may be determined based on machine learning or artificial intelligence in some implementations.

When the UE stores both compressed and uncompressed data in a single queue and is reporting information for that queue in the BSR, the UE will building the TB from the compressed and uncompressed data in a single queue. For example, the UE will build the TB with compressed data (e.g., compressed packets) from the compressed queue and then will build the TB with uncompressed data (e.g., uncompressed packets) from the compressed queue. In some such implementations, the UE may further add second compressed data to the TB after the uncompressed data. This second compressed data may correspond to data which has been compressed after sending the BSR report and before receiving the uplink grant. Such operations increase network utilization and reduce padding.

Regarding the compressed queue, the UE will ensure that compressed queue maintains a certain threshold of compressed data, uncompressed data, or both. For example, the UE can compressed data from the uncompressed queue and place in in the compressed queue to maintain compressed data above or equal to a compressed data threshold. As another example, the UE can move uncompressed data from the uncompressed queue to the compressed queue to buffer/queue uncompressed data (e.g., packets with uncompressed profile) in the compressed queue to maintain uncompressed data above or equal to a uncompressed data threshold or combined data above or equal to a combined data threshold. However, the UE should not just endlessly stuff uncompressed data in the compressed queue just to eliminate all padding. Doing so will reduce compression efficiency and will reduce the advantage of sending compressed data. The thresholds may be determined on physical parameters, historical parameters, or both. To illustrate, the UE may consider a worst time or average time for compression and always attempt to maintain X number of uncompressed packets/bytes in the compressed queue or X number of total (compressed and uncompressed) packets/bytes in the compressed queue The aspects described herein may enable reduced or minimized MAC padding in TB generated by a transmitting device in one or more operating modes. For example, a UE may reduce MAC padding when operating with a Robust Header Compression (ROHC) profile (e.g., profile6) or when Uplink Data Compression (UDC) is configured. As compared to previous solutions, when the UE is sending BSR information about multiple queues, a number of bytes allocated to the UE is always greater than a total of compressed bytes sent because some packets are sent using an uncompressed profile.

Alternatively, when the UE is sending BSR information about a single queue which stores compressed and uncompressed data, the techniques described herein enable MAC padding to be reduced to zero or enable minimal MAC padding while maintaining (e.g., without sacrificing) relatively high compression efficiency.

Figure 3:
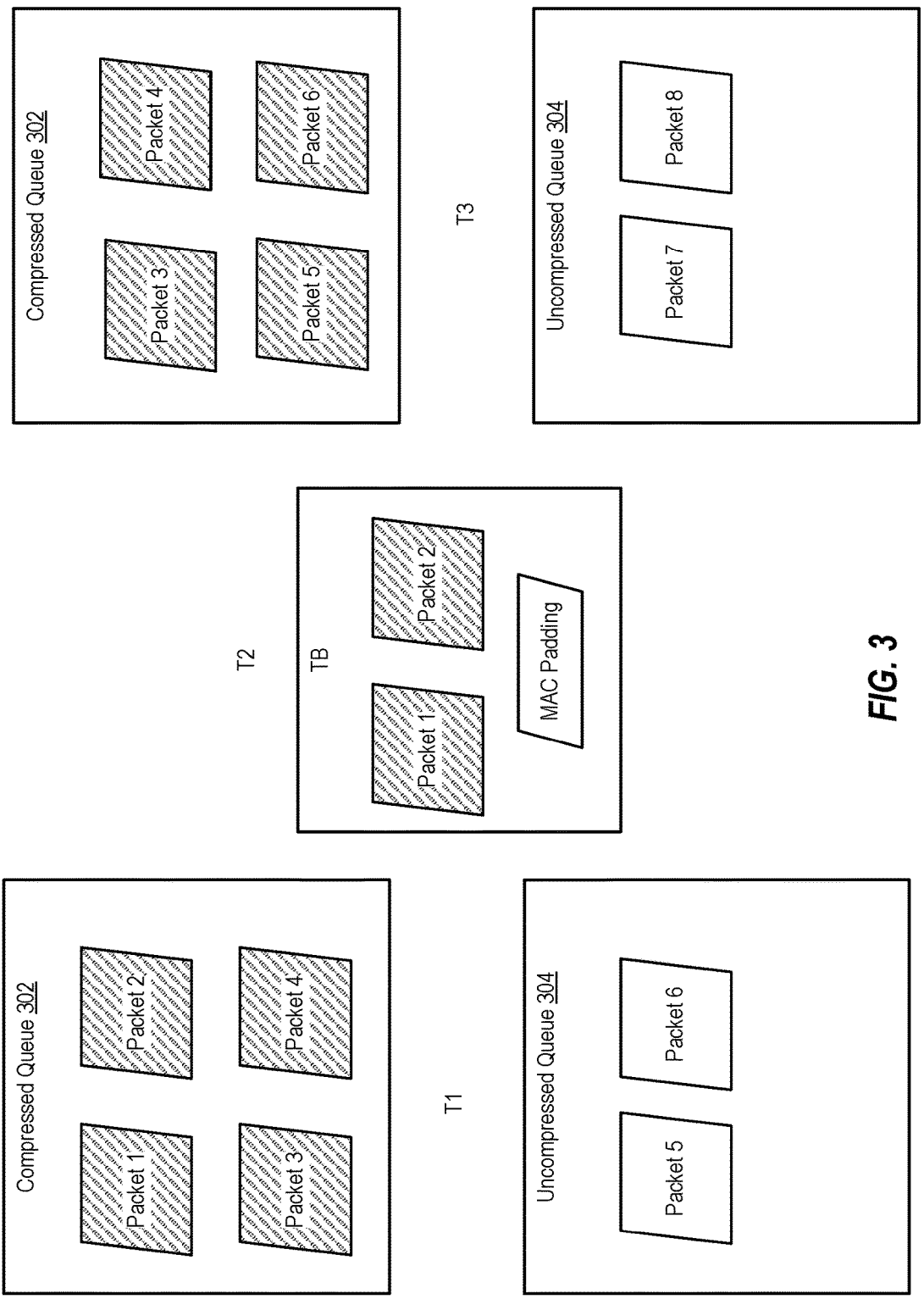
FIG. 3 is a diagram illustrating an example of packet buffering for wireless communication.

FIG. 3 illustrates a diagram of an example of packet buffering for wireless communication. In FIG. 3, a high level overview for packet buffering and TB generation is illustrated. FIG. 3 depicts a device having two queues, a compressed queue and an uncompressed queue, over multiple time periods.

At a first time period, T1, the device has four packets in a compressed queue 302 and two packets in an uncompressed queue 304. The device may determine a number of packets in the queues 302, 304 and transmit such information to a host device (e.g., base station or network device). For example, the device may transmit a BSR indicating information about the data awaiting to be transmitted in the queues 302, 304.

At a second time period, T2, the device receives an uplink grant from the host device and generates a TB for an uplink occasion or instance indicated by the uplink grant. As illustrated in the example of FIG. 3, the device builds a TB with two compressed packets, packet 1 and packet 2, from the compressed queue 302. The device may send a transmission, such as a PUSCH transmission, which includes the TB. The uplink grant or occasion/instance may indicate or be associated with an allotted amount of data for the transmission. The device may build the TB based on the data allotted to it for the uplink occasion/instance.

At a third time period, T3, the device compresses more data and moves the data to the compressed queue 302. As illustrated in FIG. 3, the device compresses two additional packets (packets 5 and 6) offline and moves the two additional packets to the compressed queue 302. To illustrate, the device compresses the packets before receiving another uplink grant. The device may again report information about the queues 302, 304 to the host device via a second BSR.

At subsequent time periods the device may build another TB from whatever packets are in the compressed queue 302 and may pad any additional data allocated to it by the network or host device. The device will not build the TB from data outside of the compressed queue 302, such as uncompressed data of the uncompressed queue 304. Accordingly, the device may not fully utilize the network resources and bandwidth allotted to it, and thus throughput may be reduced and latency may be increased.

Figure 4:
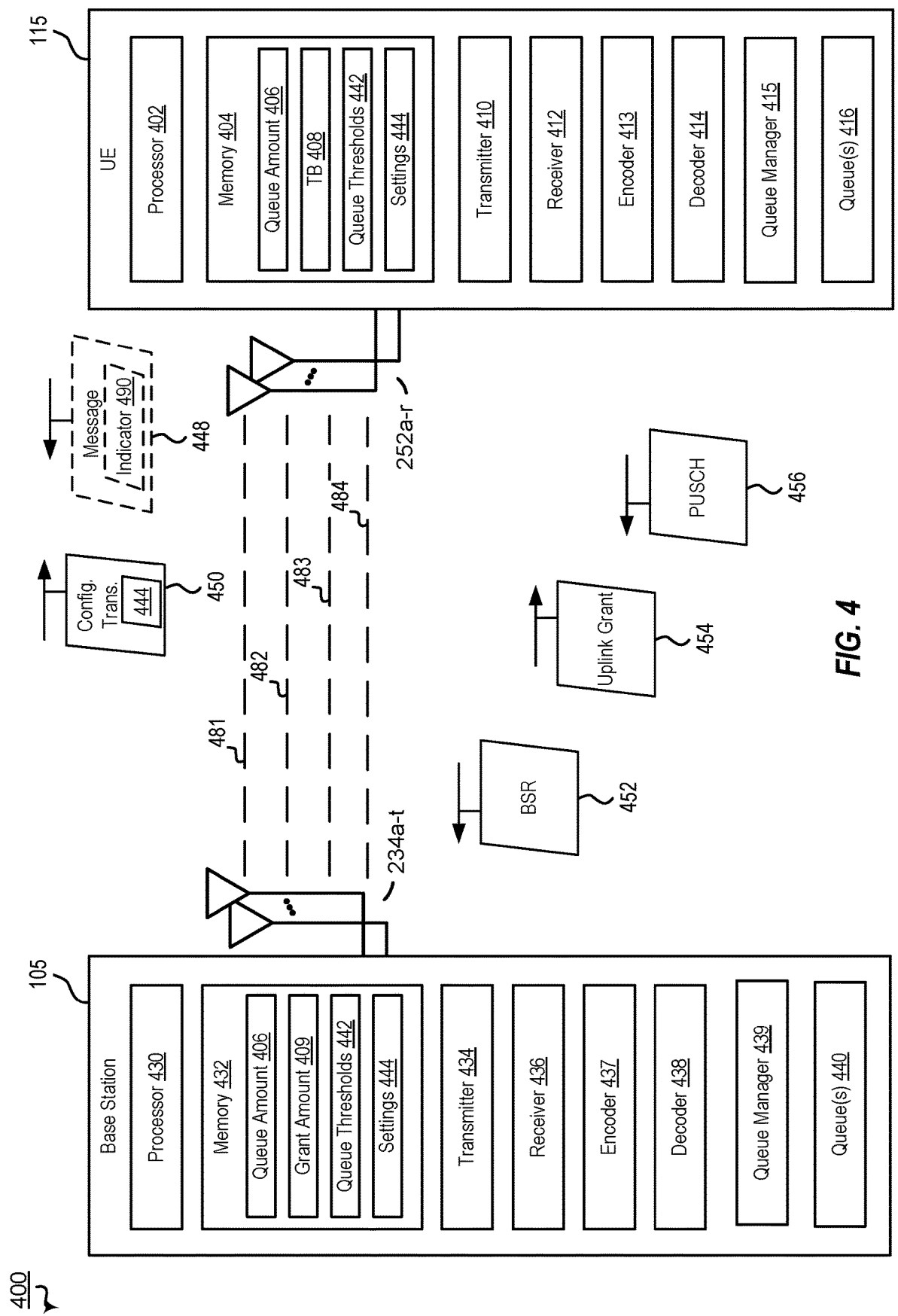
FIG. 4 is a block diagram illustrating an example wireless communication system of enhanced packet compression operations in accordance with aspects of the present disclosure according to one or more aspects.

FIG. 4 illustrates an example of a wireless communications system 400 that supports enhanced packet compression operations in accordance with aspects of the present disclosure. In some examples, wireless communications system 400 may implement aspects of wireless communication system 100. For example, wireless communications system 400 may include multiple wireless communication devices and optionally a network entity. In the example of FIG. 4, the wireless communications system 400 includes a base station 105 and a UE 115. Enhanced packet compression operations may include the transmission of compressed and uncompressed packets in the same TB. The uncompressed packets may be stored in a compressed queue in some implementations, and in other implementations, the TB is built from the uncompressed queue (and the uncompressed packets therein). Use of the compressed and uncompressed packets to build a TB may improve grant utilization. For example, a UE may more fully utilize uplink bandwidth allocations (e.g., with zero or minimal MAC padding) by filling space that would otherwise be empty with uncompressed data (e.g., uncompressed packets) Accordingly, data capacity and throughput are increased and latency is reduced.

UE 115 and base station 105 may be configured to communicate via one or more portions of the electromagnetic spectrum. The electromagnetic spectrum is often subdivided, based on frequency/wavelength, into various classes, bands, channels, etc. In 5G NR two initial operating bands have been identified as frequency range designations FR1 (410 MHz–7.125 GHz) and FR2 (24.25 GHz–52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "mmWave" band in documents and articles, despite being different from the extremely high frequency (EHF) band (30 GHz–300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

It is noted that Sub-carrier spacing (SCS) may be equal to 15, 30, 60, or 120 kHz for some data channels. UE 115 and base station 105 may be configured to communicate via one or more component carriers (CCs), such as representative first CC 481, second CC 482, third CC 483, and fourth CC 484. Although four CCs are shown, this is for illustration only, more or fewer than four CCs may be used. One or more CCs may be used to communicate control channel transmissions, data channel transmissions, and/or sidelink channel transmissions.

Such transmissions may include a Physical Downlink Control Channel (PDCCH), a Physical Downlink Shared Channel (PDSCH), a Physical Uplink Control Channel (PUCCH), a Physical Uplink Shared Channel (PUSCH), a Physical Sidelink Control Channel (PSCCH), a Physical Sidelink Shared Channel (PSSCH), or a Physical Sidelink Feedback Channel (PSFCH). Such transmissions may be scheduled by aperiodic grants and/or periodic grants.

Each periodic grant may have a corresponding configuration, such as configuration parameters/settings. The periodic grant configuration may include configured grant (CG) configurations and settings. Additionally, or alternatively, one or more periodic grants (e.g., CGs thereof) may have or be assigned to a CC ID, such as intended CC ID.

Each CC may have a corresponding configuration, such as configuration parameters/settings. The configuration may include bandwidth, bandwidth part, HARQ process, TCI state, RS, control channel resources, data channel resources, or a combination thereof. Additionally, or alternatively, one or more CCs may have or be assigned to a Cell ID, a Bandwidth Part (BWP) ID, or both. The Cell ID may include a unique cell ID for the CC, a virtual Cell ID, or a particular Cell ID of a particular CC of the plurality of CCs. Additionally, or alternatively, one or more CCs may have or be assigned to a HARQ ID. Each CC may also have corresponding management functionalities, such as, beam management, BWP switching functionality, or both. In some implementations, two or more CCs are quasi co-located, such that the CCs have the same beam and/or same symbol.

In some implementations, control information may be communicated via UE 115 and base station 105. For example, the control information may be communicated suing MAC-CE transmissions, RRC transmissions, SCI (sidelink control information), transmissions, another transmission, or a combination thereof.

UE 115 can include a variety of components (e.g., structural, hardware components) used for carrying out one or more functions described herein. For example, these components can includes processor 402, memory 404, transmitter 410, receiver 412, encoder, 413, decoder 414, queue manager (e.g., buffer manager) 415, queues (e.g., buffers) 416, and antennas 252a-r. Processor 402 may be configured to execute instructions stored at memory 404 to perform the operations described herein. In some implementations, processor 402 includes or corresponds to controller/processor 280, and memory 404 includes or corresponds to memory 282. Memory 404 may also be configured to store queue (e.g., buffer) amount data 406, transport block (TB) data 408, queue (e.g., buffer) thresholds data 442, settings data 444, or a combination thereof, as further described herein.

The queue amount data 406 includes or corresponds to data associated with one or more transmit data buffers or queues, such as queue(s) 416. The queue amount data 406 may include or correspond to data which indicates an amount of data in a compressed queue (e.g., 416), an amount of data in a compressed queue (e.g., 416), or both. When the queue amount data 406 indicates both the compressed and uncompressed queues, the queue amount data 406 may be a single value which indicates a total amount of data or multiple (e.g., two) values indicating respective amounts of data in the queues. Alternatively, the queue amount data 406 may indicate a capacity or remaining capacity of one or more queues. The queue amount data 406 may be used to generate a BSR or may be included in a BSR.

The TB data 408 includes or corresponds to data associated with one or more TBs. The TB data 408 may include data to be sent over the air and may include or correspond to payload data. The TB data 408 may include data from or be generated based on data from the queue or queues 416, such as the compressed queue, the uncompressed queue, or both. The TB data 408 may include compressed data which has been compressed offline, such as data which has been compressed after sending a BSR but before receiving a grant message. In some implementations, the TB data 408 includes no padding (e.g., no MAC padding), and in other implementations the TB data includes padding (e.g., low or minimal MAC padding). The TB data 408 may correspond to and/or be generated based on an amount of data allocated to the UE 115 in a received grant message.

The queue thresholds data 442 includes or corresponds to data associated with one or more queue/buffer thresholds for transmit data queues/buffers. For example, the queue thresholds data 442 may indicate an amount of compressed data, uncompressed data, or both, to the keep in the queue or queues 416. To illustrate, the queue thresholds data 442 may indicate an amount compressed data (e.g., bytes or packets) to keep in the compressed queue, an amount uncompressed data (e.g., bytes or packets) to keep in the compressed queue, and an amount uncompressed data (e.g., bytes or packets) to keep in the uncompressed queue, or a combination thereof. In a particular implementation, the queue thresholds data 442 indicates an amount of compressed data (e.g., bytes or packets) to keep in the compressed queue and an amount of uncompressed data (e.g., bytes or packets) to keep in the compressed queue. Additionally, or alternatively, the thresholds of the queue thresholds data 442 may be generated based on machine learning or artificial intelligence. For example, a device may using machine learning to determine a threshold or thresholds based on an estimated time for compression, a maximum physical layer capacity, and history information for the previous uplink grants. The history information for the previous uplink grants may include compression efficiency information, an amount of MAC padding bytes, or a combination thereof. In other implementations, the thresholds may be determined by another device and receive in a settings or configuration message, such as DCI or RRC message.

The settings data 444 includes or corresponds to settings and/or conditions data for enhanced packet compression operations. The settings data 444 may include settings indicating the queue threshold data 442 and/or how to generate the queue threshold data 442. Additionally, or alternatively, the settings data 444 may indicate a type of BSR to transmit, whether to switch between BSR modes, and/or whether to store uncompressed data in the compressed queue. In some implementations, the settings data further indicates a ROCH profile (e.g., profile6), UHC, or both.

Transmitter 410 is configured to transmit data to one or more other devices, and receiver 412 is configured to receive data from one or more other devices. For example, transmitter 410 may transmit data, and receiver 412 may receive data, via a network, such as a wired network, a wireless network, or a combination thereof. For example, UE 115 may be configured to transmit and/or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 410 and receiver 412 may be replaced with a transceiver. Additionally, or alternatively, transmitter 410, receiver, 412, or both may include or correspond to one or more components of UE 115 described with reference to FIG. 2.

Encoder 413 and decoder 414 may be configured to encode and decode data for transmission. Queue manager 415 may be configured to determine and perform enhanced packet compression operations. For example, the queue manager 415 may be configured to perform queue information reporting mode or adjustments, such as BSR type. As another example, the queue manager 415 may be configured to generate TB (e.g., perform TB building). Additionally, or alternatively, queue manager 415 may be configured to perform compression and coordinate queue storage operations, such as storing data in queues, moving data from one queue to another, removing data from queues, determining queue thresholds, adjusting queue thresholds, or a combination thereof.

Queues 416 may be configured to store data for transmissions. For example, queues 416 may include a compressed queue and an uncompressed queue. The compressed queue is configured to store compressed data for uplink (and/or sidelink) transmissions, and the uncompressed queue is configured to store uncompressed data for transmissions. In a particular implementation, the compressed queue is further configured to store uncompressed data for uplink (and/or sidelink) transmissions. The uncompressed data in either queue may be awaiting compression and/or awaiting to be used to fill a TB instead of padding (e.g., instead of adding one or more zeros to the bit stream).

Base station 105 includes processor 430, memory 432, transmitter 434, receiver 436, encoder 437, decoder 438, queue manager 439, queues 440, and antennas 234a-t. Processor 430 may be configured to execute instructions stores at memory 432 to perform the operations described herein. In some implementations, processor 430 includes or corresponds to controller/processor 240, and memory 432 includes or corresponds to memory 242. Memory 432 may be configured to store queue amount data 406, queue thresholds data 442, settings data 444, or a combination thereof, similar to the UE 115 and as further described herein. Memory 432 may also be configured to store grant data 409. Grant data 409 may be generated based on received buffer status report information (e.g., BSR 452) and may indicate one or more uplink instances for a device (e.g., UE 115) and a corresponding allotted amount of data to transmit. Memory 432 may further be configured to store TB data 408 similar to the UE 115 and as further described herein.

Transmitter 434 is configured to transmit data to one or more other devices, and receiver 436 is configured to receive data from one or more other devices. For example, transmitter 434 may transmit data, and receiver 436 may receive data, via a network, such as a wired network, a wireless network, or a combination thereof. For example, base station 105 may be configured to transmit and/or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 434 and receiver 436 may be replaced with a transceiver. Additionally, or alternatively, transmitter 434, receiver, 436, or both may include or correspond to one or more components of base station 105 described with reference to FIG. 2.

Encoder 437, and decoder 438 may include the same functionality as described with reference to encoder 413 and decoder 414, respectively. Queue manager 439 may include similar functionality as described with reference to queue manager 415. Queues 440 may include similar functionality as described with reference to queues 416.

During operation of wireless communications system 400, base station 105 may determine that UE 115 has enhanced packet compression capability. For example, base station 105 may transmit a message 448 that includes an enhanced packet compression indicator 490. Indicator 490 may indicate enhanced packet compression transmissions or a particular type or mode of packet compression transmissions. In some implementations, a base station 105 sends control information to indicate to UE 115 that enhanced packet compression and/or a particular type of enhanced packet compression is to be used. For example, in some implementations, message 448 (or another message, such as configuration transmission 450) is transmitted by the base station 105. The configuration transmission 450 may include or indicate to use enhanced packet compression or to adjust or implement a setting of a particular type of enhanced packet compression. For example, the configuration transmission 450 may include settings data 444, as indicated in the example of FIG. 4, queue thresholds data 442, or both.

During operation, devices of wireless communications system 400, perform enhanced packet compression operations. For example, the wireless communication devices (e.g., a base station and UE) exchange transmissions via a downlink channel, an uplink channel, a sidelink channel, or a combination thereof. In the example of FIG. 4, the UE 115 transmits a BSR 452 to the base station 105. The BSR 452 may include or correspond to a DCI or MAC CE transmission. The BSR 452 may be generated based on data in the queues 416 and indicate and amount of information in one or more of the queues 416. The base station 105 may receive the BSR 452 and may determine an amount of information (e.g., bits or packets) to allocate to the UE 115 based at least on the BSR 452. The base station 105 may determine the amount of information further based on historical information and/or channel parameters and network information.

The base station 105 transmits an uplink grant 454 to the UE 115. The uplink grant 454 may include or correspond to a PDCCH transmission which schedules or indicates one or more uplink instances for the UE 115. The uplink grant 454 may further indicate an amount of data allocated to the UE 115 for the one or more uplink instances, such as grant data 409.

The UE 115 generates a data transmission, such as a PUSCH transmission 456, responsive to the uplink grant 454. For example, the UE 115 determines an amount of data to send based on the uplink grant 454 and generates a TB from data of one or more of the queues 416. Examples of details of TB generation is described further with reference to FIGS. 6-8. The TB includes packets with both compressed and uncompressed profiles, or said another way includes compressed and uncompressed data. The TB is included in or indicated by the PUSCH transmission 456. The PUSCH transmission 456 may have less padding than if only compressed packets/data were sent.

Accordingly, the UE 115 and base station 105 may be able to more effectively utilize network bandwidth. Thus, FIG. 4 describes enhanced packet compression operations; using enhanced packet compression operations may enable increased throughput and reduced latency.

Figure 5:
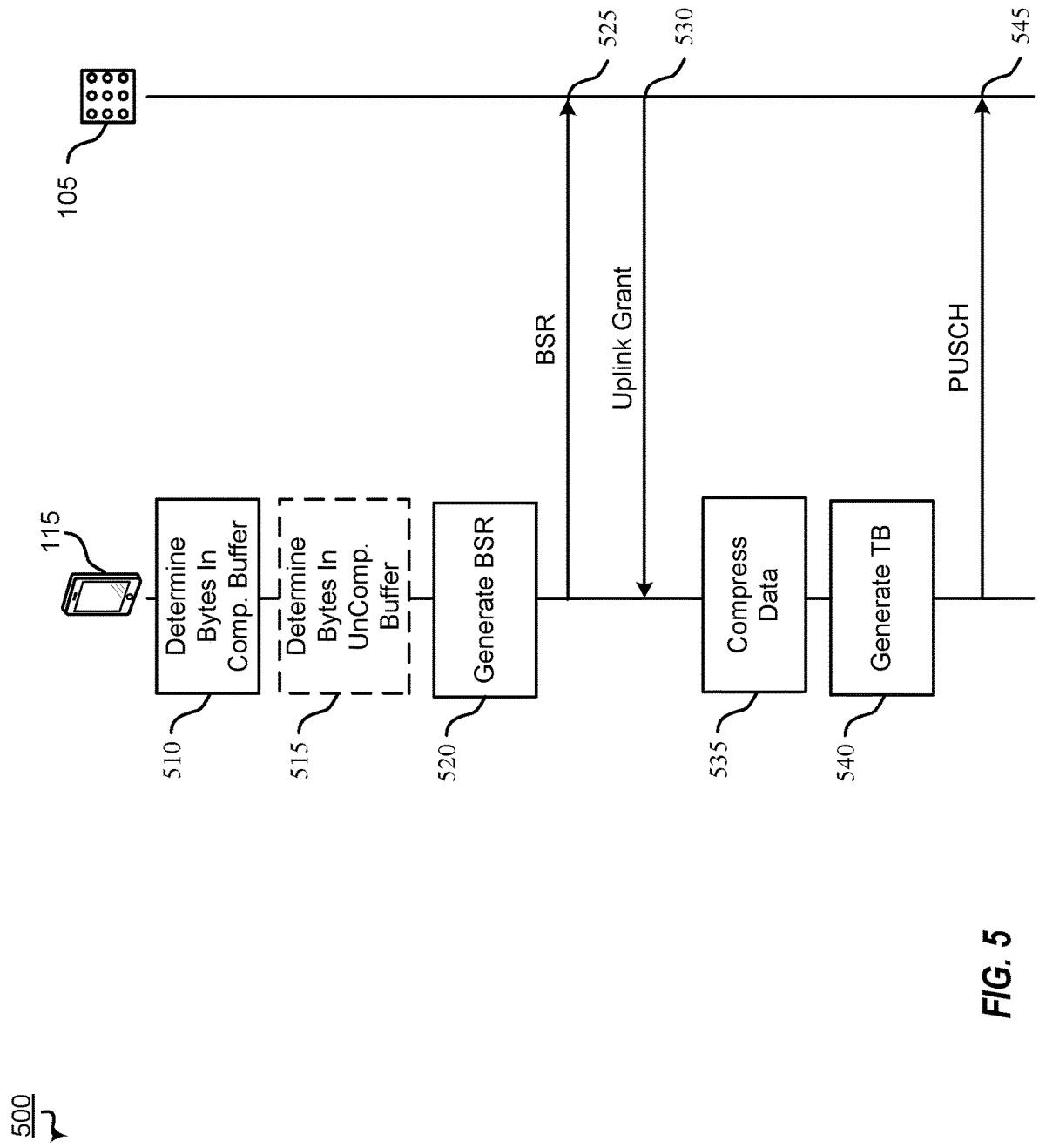
FIG. 5 is a ladder diagram illustrating an example of enhanced packet compression operations according to some aspects.

FIG. 5 illustrates an example of a ladder diagram for enhanced packet compression operations according to some aspects. Referring to FIG. 5, FIG. 5 is a ladder diagram 500 of transmitting a TB including packets with compressed and uncompressed profiles. Examples of TB building are further illustrated and described with reference to FIGS. 6 and 7, and examples of TBs are further illustrated and described with reference to FIG. 8. In the example of FIG. 5, the ladder diagram 500 illustrates a UE 115 and a network entity, such as base station 105 and enhanced packet compression operations.

At 510, the UE 115 determines an amount of compressed information in a compressed queue. For example, the UE 115 determines an amount of compressed packets in the compressed queue. As illustrated in the example of FIG. 5, the UE 115 determines an amount of compressed bytes in the compressed queue. The UE 115 may determine the amount of information to keep in the compressed queue based on a threshold value, as described with reference to FIG. 4. The UE 115 may compress information from an uncompressed queue to fill the compressed queue.

At 515, the optionally UE 115 determines an amount of uncompressed information in an uncompressed queue. For example, the UE 115 determines an amount of uncompressed packets in the uncompressed queue. As illustrated in the example of FIG. 5, the UE 115 determines an amount of uncompressed bytes in the compressed queue. The UE 115 may determine the amount of information to keep in the uncompressed queue based on a threshold value, as described with reference to FIG. 4.

At 520, the UE 115 generates beam status report information. For example, the UE 115 generates a beam status report message based on the compressed queue information, the uncompressed queue information, or both.

At 525, the UE 115 transmits the beam status report information. For example, the UE 115 transmits a beam status report message to the base station 105. As illustrated in the example of FIG. 5, the UE 115 transmits a beam status report transmission.

At 530, the base station 105 transmits one or more uplink grants to the UE 115 responsive to the beam status report transmission. For example, the base station 105 transmits a particular uplink grant message indication at least one uplink grant. The uplink grant message indicates an amount of information associated with the uplink grant or grants. The base station 105 determines the amount of information for the uplink grant based on the amount of information in the queues of the UE 115 indicated by the beam status report information.

At 535, the UE 115 may optionally compress uncompressed data from the uncompressed queue to generate compressed data (e.g., second compressed data or newly compressed data). The compressed data may be stored in the compressed queue. The compressed queue may now store more compressed data than indicated in the buffer status report information.

At 540, the UE 115 generates a transport block based on the uplink grant transmission. For example, the UE 115 generates a transport block from the information of at least the compressed queue and optionally information from the uncompressed queue based on the uplink grant. The amount of information of the transport block is determined based on the amount of information associated with uplink grant. Example TBs are illustrated described further with respect to FIG. 7.

At 545, the UE 115 generates a PUSCH based on the TB and transmits the PUSCH. For example, the UE 115 transmits the PUSCH to the base station 105. In other implementations, the UE 115 may transmit a sidelink message (e.g., PSSCH) as an alternative to the PUSCH.

Thus, in the example in FIG. 5, the UE uses enhanced packet compression operations by enhanced queue management and TB generation operations. By performing enhanced packet compression operations throughput may be increased and latency may be reduced.

Figure 6:
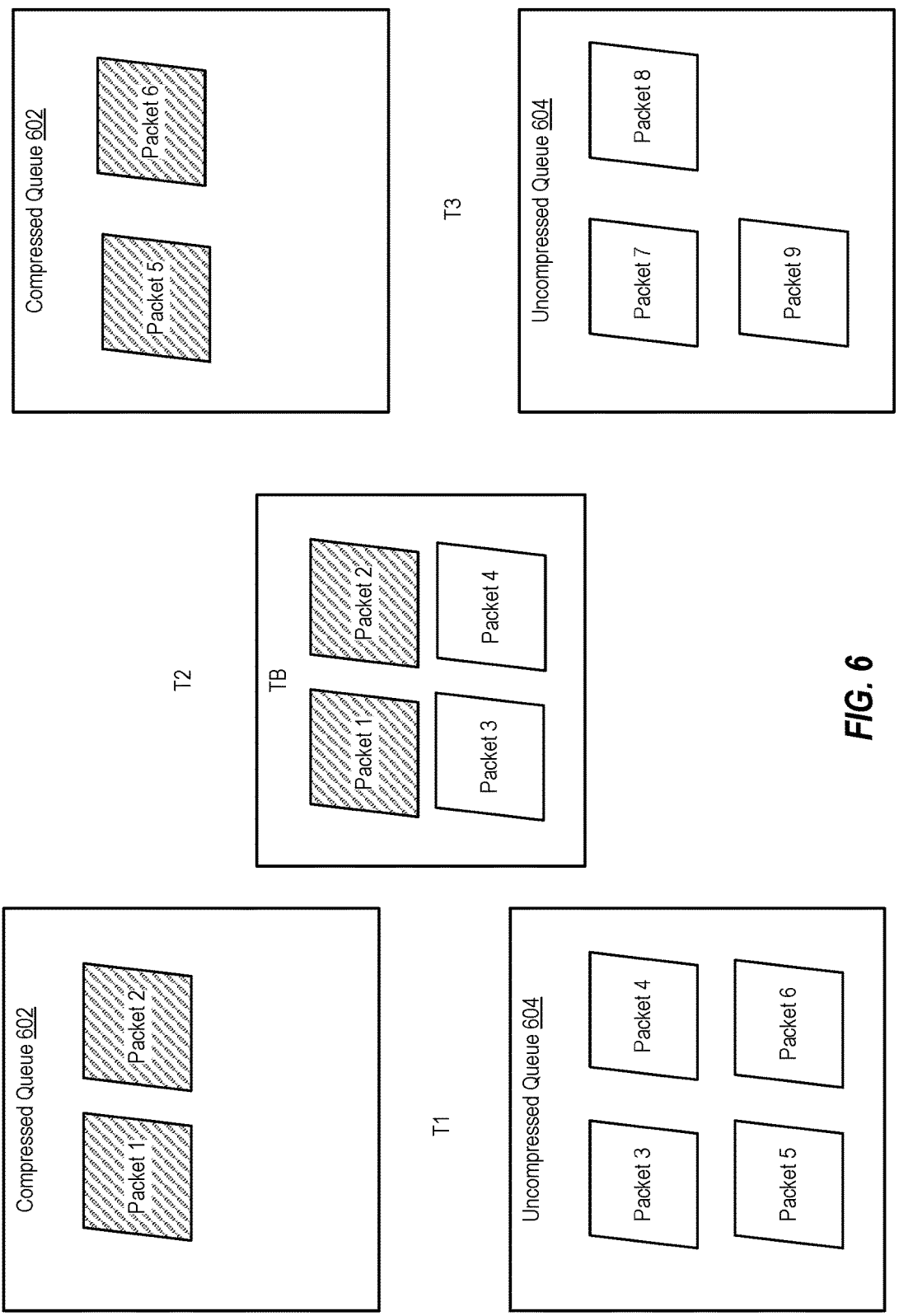
FIG. 6 is a block diagram illustrating an example of packet buffering for enhanced packet compression operations according to some aspects.

FIG. 6 is a block diagram illustrating an example of packet buffering for enhanced packet compression operations according to some aspects. Referring to FIG. 6, FIG. 6 depicts a device having two queues, a compressed queue 602 and an uncompressed queue 604, over multiple time periods.

At a first time period, T1, the device has two packets in a compressed queue 602 and four packets in an uncompressed queue 604. The device may determine a number of packets in the queues 602, 604 and transmit such information to a host device (e.g., base station or network device). For example, the device may transmit a BSR indicating information about the data awaiting to be transmitted in the queues 602, 604.

At a second time period, T2, the device receives an uplink grant from the host device and generates a TB for an uplink occasion or instance indicated by the uplink grant. As illustrated in the example of FIG. 6, the device builds a TB with two compressed packets, packet 1 and packet 2, from the compressed queue 602 and with two uncompressed packets, packet 3 and packet 4, from the uncompressed queue 604. The device may send a transmission, such as a PUSCH transmission, which includes the TB. The uplink grant or occasion/instance may indicate or be associated with an allotted amount of data for the transmission. The device may build the TB based on the data allotted to it for the uplink occasion/instance.

At a third time period, T3, the device compresses more data and moves the data to the compressed queue 602. As illustrated in FIG. 6, the device compresses two additional packets (packets 5 and 6) offline and moves the two additional packets to the compressed queue 602. To illustrate, the device compresses the packets before receiving another uplink grant. The device may again report information about the queues 602, 604 to the host device via a second BSR.

At subsequent time periods the device may build another TB from whatever packets are in the compressed queue 602 and may pad the TB with any additional data that is left in the allocated amount of data. Accordingly, the device may fully utilize the network resources (or more fully utilize the resources as compared to using padding) and bandwidth allotted to it, and thus throughput may be increased and latency may be reduced.

Figure 7:
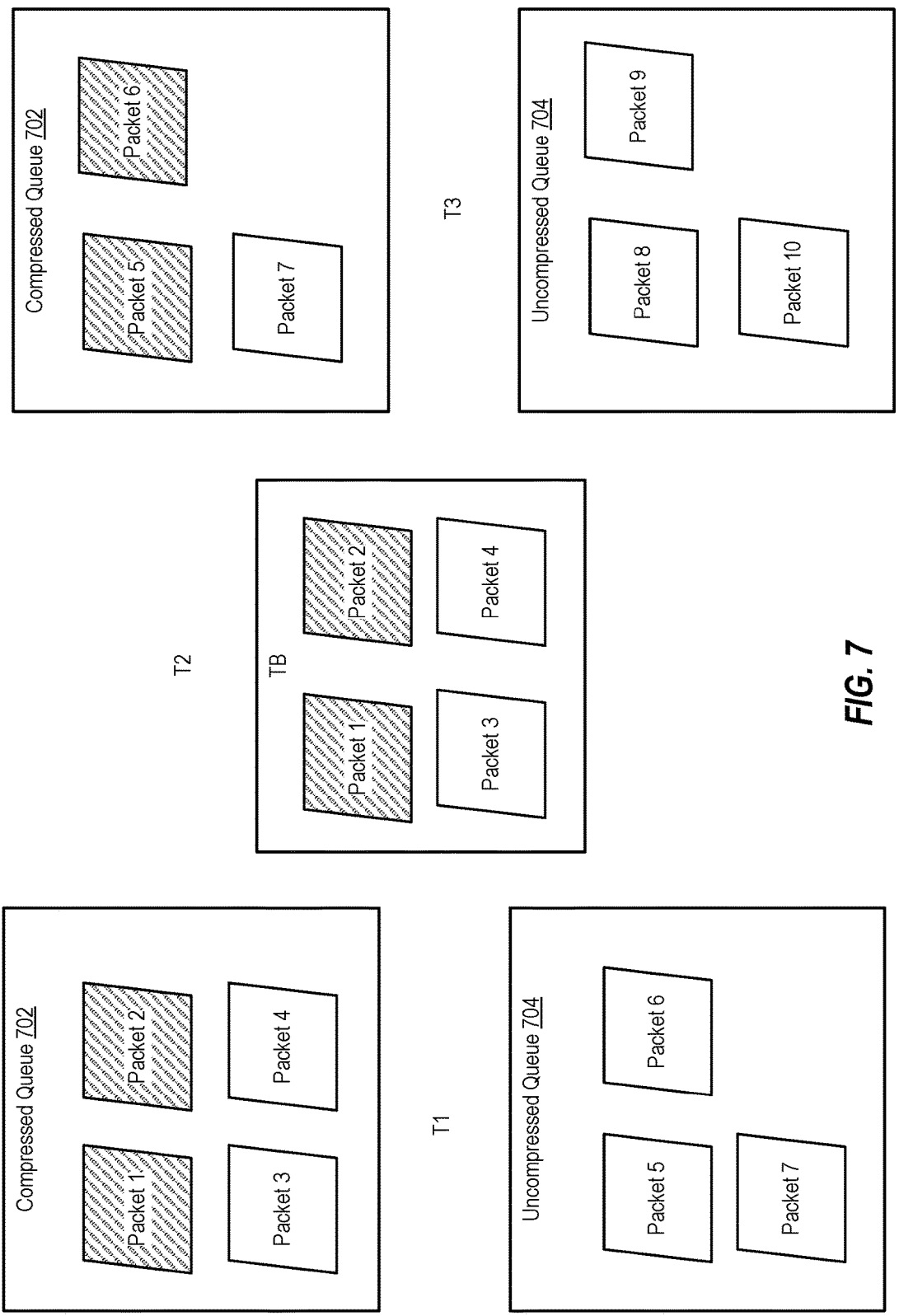
FIG. 7 is a block diagram illustrating another example of packet buffering for enhanced packet compression operations according to some aspects.

FIG. 7 is a block diagram illustrating another example of packet buffering for enhanced packet compression operations according to some aspects. Referring to FIG. 7, FIG. 7 depicts a device having two queues, a compressed queue 702 and an uncompressed queue 704, over multiple time periods.

At a first time period, T1, the device has four packets in a compressed queue 702 and three packets in an uncompressed queue 704. The device may determine a number of packets in the queues 702, 704 and transmit such information to a host device (e.g., base station or network device). For example, the device may transmit a BSR indicating information about the data awaiting to be transmitted in the queues 702, 704.

At a second time period, T2, the device receives an uplink grant from the host device and generates a TB for an uplink occasion or instance indicated by the uplink grant. As illustrated in the example of FIG. 7, the device builds a TB with two compressed packets, packet 1 and packet 2, from the compressed queue 702 and with two uncompressed packets, packet 3 and packet 4, from the compressed queue 702. The device may send a transmission, such as a PUSCH transmission, which includes the TB. The uplink grant or occasion/instance may indicate or be associated with an allotted amount of data for the transmission. The device may build the TB based on the data allotted to it for the uplink occasion/instance.

At a third time period, T3, the device compresses more data and moves the data to the compressed queue 702. As illustrated in FIG. 7, the device compresses two additional packets (packets 5 and 6) offline and moves the two additional packets to the compressed queue 702. To illustrate, the device compresses the packets before receiving another uplink grant. The device also moves one additional uncompressed packet (packet 7) from the uncompressed queue 704 to the compressed queue 702. The device may again report information about the queues 702, 704 to the host device via a second BSR.

At subsequent time periods the device may build another TB from whatever packets are in the compressed queue 702 and may pad any additional data. The device will not build the TB from data outside of the compressed queue 702, such as uncompressed data of the uncompressed queue 704. Accordingly, the device may not fully utilize the network resources and bandwidth allotted to it, and thus throughput may be reduced and latency may be increased as compared to the operations of FIG. 6. However, the operations of FIG. 7 may have a higher portion of compressed data and may have a reduced chance of having their resources reduced by the network as compared to the operations of FIG. 6.

Figure 8:
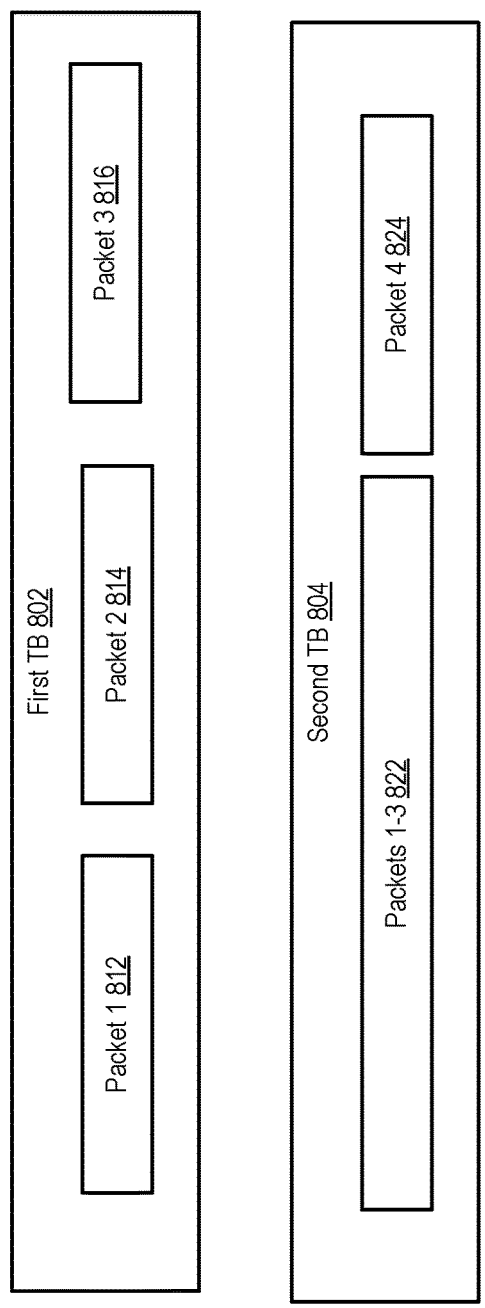
FIG. 8 is a block diagram of various transport blocks corresponding to enhanced packet compression operations according to some aspects.

Referring to FIG. 8, FIG. 8 is a block diagram of various transport blocks corresponding to enhanced packet compression operations according to some aspects. In the example of FIG. 8, two exemplary TBs generated by the enhanced compression techniques described herein are shown.

A first TB includes first compressed data, uncompressed data, and second compressed data. As illustrated in FIG. 8, the uncompressed data (Packet 2 814 with an uncompressed profile, an uncompressed packet) is between the compressed data (two packets, Packet 1 812 and Packet 3 816, with compressed profiles, compressed packets. The first compressed data/packet may correspond to data which was previously compressed and reported in the BSR, and the second compressed data/packet may include or correspond to data which was compressed after the BSR was sent and prior to the corresponding uplink grant being received.

A second TB includes compressed data and uncompressed data. As compared to the first TB, the second TB has all of the compressed data positioned in front of the uncompressed data. In the example of FIG. 8, the Packets 1-3 822 may have a compressed profile and have compressed data, and Packet 4 824 may have an uncompressed profile and have uncompressed data.

Although both TBs include both compressed and uncompressed information, in other implementations a TB may include only compressed information or may include only uncompressed information. To illustrate, if there is enough compressed information the UE 115 may only generate a TB based on compressed information. Conversely, if there is no compressed information, the UE 115 may generate a TB based only on uncompressed information.

Additionally, or alternatively, one or more operations of FIGS. 4-8 may be added, removed, substituted in other implementations. For example, in some implementations, the example steps of FIGS. 6 and 7 may be used together. To illustrate, a device may switch between the operations of FIGS. 6 and 7 responsive to an indication from a host device or responsive to a determination regarding compression efficiency or padding amounts. As another example, some of the operations of FIGS. 4 and 5 may be used with the steps of any of FIGS. 6 and 7.

Figure 11:
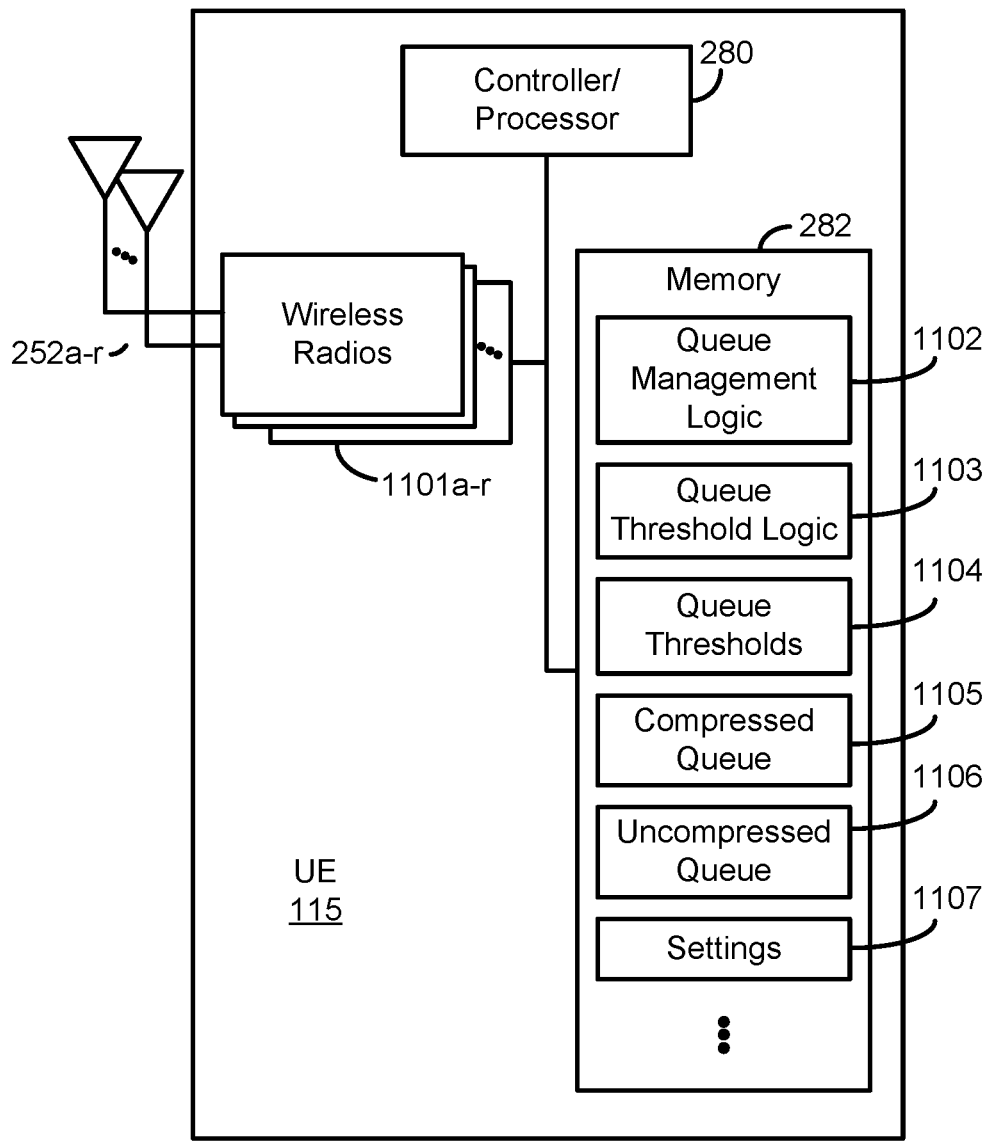
FIG. 11 is a block diagram of an example UE that supports use of enhanced packet compression operations according to one or more aspects.

FIG. 9 is a flow diagram illustrating example blocks executed by a wireless communication device (e.g., a UE or base station) configured according to an aspect of the present disclosure. The example blocks will also be described with respect to UE 115 as illustrated in FIG. 11. FIG. 11 is a block diagram illustrating UE 115 configured according to one aspect of the present disclosure. UE 115 includes the structure, hardware, and components as illustrated for UE 115 of FIGS. 2 and/or 4. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1101a-r and antennas 252a-r. Wireless radios 1101a-r includes various components and hardware, as illustrated in FIG. 2 for UE 115, including modulator/demodulators 254a-r, MIMO detector 256, receive processor 258, transmit processor 264, and TX MIMO processor 266. As illustrated in the example of FIG. 11, memory 282 stores queue management logic 1102, queue threshold logic 1103, queue thresholds data 1104, compressed queue data 1105, uncompressed queue data 1106, and settings data 1107.

At block 900, a wireless communication device, such as a UE, determines a number of bytes in a compressed queue and a number of bytes in an uncompressed queue. For example, the UE 115 determines a number of bytes of one or more packets stored in queues 416, as described with reference to FIGS. 4-7. The queues 416 may include a compressed queue and an uncompressed queue. In some implementations, the compressed queue may store only compressed data, such as compressed bytes of compressed packets. In other implementations, the compressed queue may store both compressed data and uncompressed data, such as uncompressed bytes of uncompressed packets.

At block 901, the UE 115 transmits a buffer status report (BSR) indicating at least the number of bytes in the compressed queue. For example, the UE 115 generates a BSR report and transmits the BSR report, as described with reference to FIGS. 4-7. The BSR report may be included in a BSR message or another transmission.

At block 902, the UE 115 receives an uplink grant indicating one or more uplink grant resources and a number of bytes allocated for the one or more uplink grant resources. For example, the UE 115 receives an uplink grant which indicates one or more uplink grant resources (such as transmit opportunities) and which indicates a number of bytes allocated for the one or more uplink grant resources, as described with reference to FIGS. 4-7. In some implementations, the number of bytes allocated for the one or more uplink grant resources is the same. In other implementations, the number of bytes allocated for the one or more uplink grant resources is different. In some such implementations, the different numbers of bytes may be allocated per uplink grant resource.

At block 903, the UE 115 generates a transport block (TB) based on the uplink grant and the BSR and from data of at least the compressed queue, wherein the TB includes one or more compressed packets and one or more uncompressed packets. For example, the UE 115 generates a TB from packets with both compressed and uncompressed profiles, as described with reference to FIGS. 4-7. The TB may be generated from both queues, or from only a single queue. To illustrate, the TB may be generated only from the compressed queue, when the compressed queue stores both compressed and uncompressed packets, such as illustrated and described with reference to FIG. 7. Alternatively, the TB may be generated from both queues when the compressed queue stores only compressed packets, such as illustrated and described with reference to FIG. 6.

At block 904, the UE 115 transmits a PUSCH transmission including the TB during an uplink grant resource of the one or more uplink grant resources. For example, the UE 115 includes the TB in a PUSCH transmission and uses wireless radios 1101a-r and antennas 252a-r to transmit the PUSCH transmission, as described with reference to FIGS. 4-7.

The wireless communication device (e.g., UE or base station) may execute additional blocks (or the wireless communication device may be configured further perform additional operations) in other implementations. For example, the UE 115 may perform one or more operations described above. As another example, the UE 115 may perform one or more aspects as presented below.

In a first aspect, the BSR comprises a PUSCH transmission.

In a second aspect, alone or in combination with the first aspect, the uplink grant comprises a PDCCH transmission.

In a third aspect, alone or in combination with one or more of the above aspects, the uplink grant comprises a DCI or MAC CE.

In a fourth aspect, alone or in combination with one or more of the above aspects, the BSR indicates a total number of bytes in the compressed queue and the uncompressed queue.

In a fifth aspect, alone or in combination with one or more of the above aspects, the compressed queue includes only compressed data, wherein the uncompressed queue includes only uncompressed data, and wherein generating the TB further is based on uncompressed data from the uncompressed queue.

In a sixth aspect, alone or in combination with one or more of the above aspects, the BSR indicates a total number of bytes in the compressed queue, wherein the compressed queue includes compressed data and uncompressed data, wherein generating the TB is further based on the uncompressed data from the compressed queue, and wherein the TB is generated independent of data from the uncompressed queue.

In a seventh aspect, alone or in combination with one or more of the above aspects, the compressed queue includes a first threshold of compressed data to keep in the compressed queue, and wherein the compressed queue includes a second threshold of uncompressed data to keep in the compressed queue.

In an eighth aspect, alone or in combination with one or more of the above aspects, the UE 115 generates or adjusts the first threshold, the second threshold, or both, based on an estimated time for compression, a maximum physical layer capacity, and history information for previous uplink grants, and wherein the history information for the previous uplink grants includes compression efficiency information, an amount of padding bytes, or a combination thereof.

In a ninth aspect, alone or in combination with one or more of the above aspects, the BSR includes a bitmap, and wherein the bitmap indicates the number of bytes in the compressed queue and the number of bytes in the uncompressed queue.

In a tenth aspect, alone or in combination with one or more of the above aspects, the BSR includes a bitmap, and wherein the bitmap indicates a number of packets in the compressed queue and a number of packets in the uncompressed queue.

In an eleventh aspect, alone or in combination with one or more of the above aspects, each of the uncompressed bytes are positioned after a last byte of the compressed bytes in the TB.

In a twelfth aspect, alone or in combination with one or more of the above aspects, the TB does not include any Medium Access Control (MAC) padding bits.

In a thirteenth aspect, alone or in combination with one or more of the above aspects, the number of bytes allotted is greater than the number of bytes in the compressed queue indicated by the BSR, and wherein one or more compressed packets are positioned after the uncompressed packets in the TB.

In a fourteenth aspect, alone or in combination with one or more of the above aspects, the UE 115 further: compresses a portion of the uncompressed data from the uncompressed queue to generate second compressed data; move the second compressed data to the compressed queue; and adds second uncompressed data to the uncompressed queue.

In a fifteenth aspect, alone or in combination with one or more of the above aspects, compressing the portion of the uncompressed data from the uncompressed queue to generate the second compressed data is performed after the BSR is transmitted and before the uplink grant received, and the TB further includes the second compressed data.

In a sixteenth aspect, alone or in combination with one or more of the above aspects, generating the TB includes: determining an amount of bytes allocated to the uplink grant resource based on the uplink grant; determining that the number of bytes in the compressed queue is less that the amount of bytes allocated; and determining to include at least a portion of the number of bytes in the uncompressed queue in the TB.

In a seventeenth aspect, alone or in combination with one or more of the above aspects, the number of bytes allocated to the UE in the uplink grant is always more than the total compressed bytes.

In an eighteenth aspect, the TB includes some packets sent with an uncompressed profile.

In a nineteenth aspect, alone or in combination with one or more of the above aspects, the UE is configured for Robust Header Compression (ROHC), and wherein the TB includes bytes from radio bearer configured with ROHC.

In a twentieth aspect, alone or in combination with one or more of the above aspects, the UE is configured for Uplink Data Compression (UDC).

In a twenty-first aspect, alone or in combination with one or more of the above aspects, the TB further includes one or more bytes of compressed data which was compressed after the BSR was transmitted and before the uplink grant was received.

In a twenty-second aspect, alone or in combination with one or more of the above aspects, the TB further includes Medium Access Control (MAC) padding bits.

In a twenty-third aspect, alone or in combination with one or more of the above aspects, the UE 115, responsive to determining to switch packet compression modes or receiving packet compression mode information, switches from a first packet compression mode to a second compression mode.

In a twenty-fourth aspect, alone or in combination with one or more of the above aspects, one of the first packet compression mode or the second packet compression mode is a dual queue BSR reporting mode, and wherein the other of the first packet compression mode or the second packet compression mode is a single queue BSR reporting mode with the single queue configured to store compressed and uncompressed packets.

In a twenty-fifth aspect, alone or in combination with one or more of the above aspects, the one or more compressed packets have a compressed profile and include bytes of compressed data, and wherein the one or more uncompressed packets have an uncompressed profile and include bytes of uncompressed data.

In another aspect, alone or in combination with one or more of the above aspects, a method of wireless communication includes determining, by a user equipment (UE), an estimated time for data compression; determining, by the UE, a maximum physical layer capacity and history information for previous uplink grants; determining, by the UE, a threshold number of packets to keep in a compressed queue based on the estimated time for data compression, the maximum physical layer capacity, and the history of uplink grants.

In some such aspects, the UE 115 further: determines a second threshold number (e.g., Y) of packets to keep in an uncompressed queue based on the estimated time for data compression, the maximum physical layer capacity, and the history information for the previous uplink grants.

Additionally, or alternatively, determining the threshold number (e.g., X) of packets to keep in the compressed queue includes using machine learning to determine the threshold number based on the estimated time for compression, the maximum physical layer capacity, and the history information for the previous uplink grants, and wherein the history information for the previous uplink grants includes compression efficiency information, an amount of padding bytes, or a combination thereof for one or more of the previous uplink grants.

Accordingly, wireless communication devices may perform enhanced packet compression operations by enhanced queue management and TB generation operations. By performing enhanced packet compression operations throughput may be increased and latency may be reduced.

Figure 12:
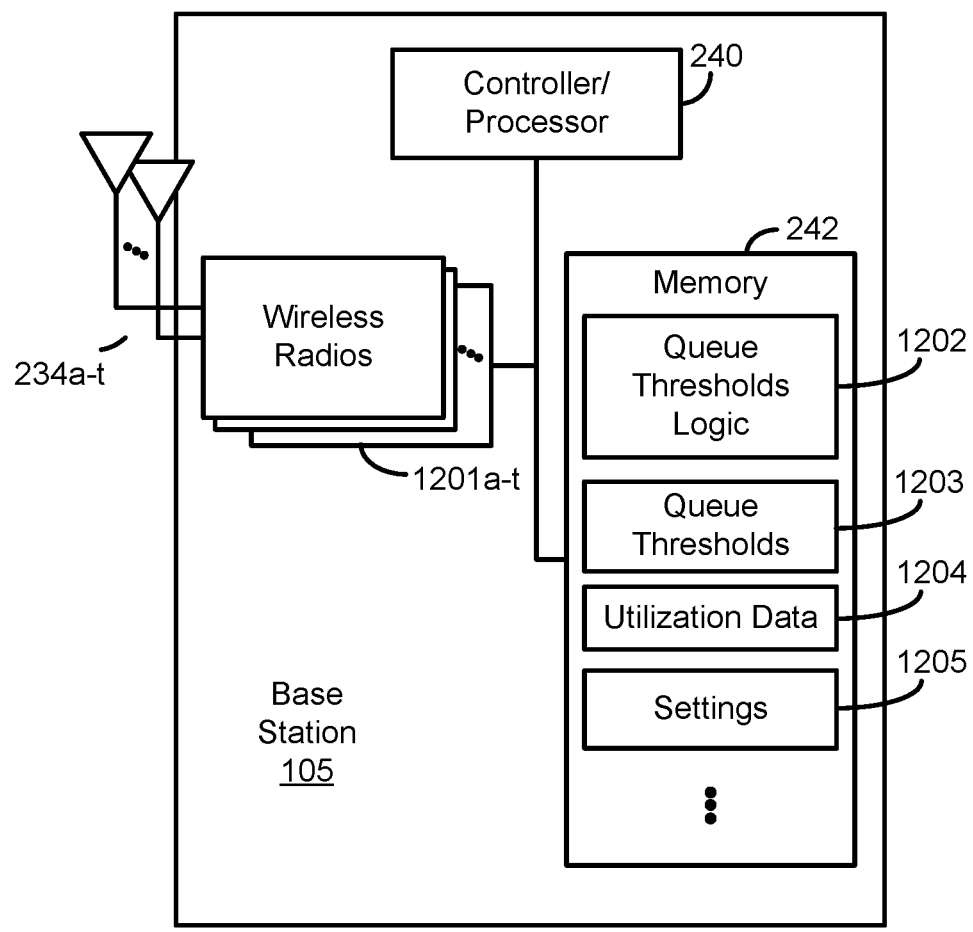
FIG. 12 is a block diagram of an example base station that supports use of enhanced packet compression operations according to one or more aspects.

FIG. 10 is a flow diagram illustrating example blocks executed wireless communication device (e.g., a UE or base station) configured according to an aspect of the present disclosure. The example blocks will also be described with respect to base station 105 as illustrated in FIG. 12. FIG. 12 is a block diagram illustrating base station 105 configured according to one aspect of the present disclosure. Base station 105 includes the structure, hardware, and components as illustrated for base station 105 of FIGS. 2 and/or 4. For example, base station 105 includes controller/processor 280, which operates to execute logic or computer instructions stored in memory 282, as well as controlling the components of base station 105 that provide the features and functionality of base station 105. Base station 105, under control of controller/processor 280, transmits and receives signals via wireless radios 1201a-t and antennas 234a-t. Wireless radios 1201a-t includes various components and hardware, as illustrated in FIG. 2 for base station 105, including modulator/demodulators 232a-r, MIMO detector 236, receive processor 238, transmit processor 220, and TX MIMO processor 230. As illustrated in the example of FIG. 12, memory 282 stores queue threshold logic 1202, queue thresholds data 1203, utilization data 1204, and settings data 1205.

At block 1000, a wireless communication device, such as a base station 105, receives a buffer status report (BSR) indicating at least a number of bytes in a compressed queue. For example, the base station 105 receives a BSR 452, as described with reference to FIGS. 4, 5, and 8. The BSR report may be included in a BSR message or another transmission.

At block 1001, the base station 105 determines a number of bytes to allocate for one or more uplink grant resources based on the BSR. For example, the base station 105 determines a number of bytes to allocate for one or more uplink grant resources based on at least the number of bytes in the compressed queue, as described with reference to FIGS. 4-8. The number of bytes allocated may be determined further based on network utilization, a number of bytes in the uncompressed queue, or both. Although a number of bytes are used, the allocation may be determined based on a number of packets in other implementations.

At block 1002, the base station 105 transmits an uplink grant indicating the one or more uplink grant resources and the number of bytes allocated for the one or more uplink grant resources. For example, the base station 105 transmits an uplink grant indicating one or more uplink grant resources and a number of bytes allocated for the one or more uplink grant resources, as described with reference to FIGS. 4-8.

At block 1003, the base station 105 receives a PUSCH transmission including a transport block (TB) during an uplink grant resource of the one or more uplink grant resources, where the TB includes one or more compressed packets and one or more uncompressed packets. For example, the base station 105 uses wireless radios 1201a-r and antennas 234a-t to receive a PUSCH transmission including a TB with both compressed and uncompressed packets, as described with reference to FIGS. 4-8.

The wireless communication device (e.g., such as UE or base station) may execute additional blocks (or the wireless communication device may be configured further perform additional operations) in other implementations. For example, the base station 105 may perform one or more operations described above. As another example, the base station 105 may perform one or more aspects as described with reference to FIG. 9.

Accordingly, wireless communication devices may perform enhanced packet compression operations by enhanced queue management and TB generation operations. By performing enhanced packet compression operations throughput may be increased and latency may be reduced.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and modules described herein (e.g., the components, functional blocks, and modules in FIG. 2) may comprise processors, electronics devices, hardware devices, electronics components, logical circuits, memories, software codes, firmware codes, etc., or any combination thereof. In addition, features discussed herein relating to queue management, packet compression, and TB generation may be implemented via specialized processor circuitry, via executable instructions, and/or combinations thereof.

Those of skill would further appreciate that the various illustrative logical blocks, modules, circuits, and algorithm steps (e.g., the logical blocks in FIGS. 2, 4, 5, and 9-12) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication comprising:
    determining, by a user equipment (UE), a number of bytes in a compressed queue and a number of bytes in an uncompressed queue;

transmitting, by the UE, a buffer status report (BSR) indicating at least the number of bytes in the compressed queue;

receiving, by the UE, an uplink grant indicating one or more uplink grant resources and a number of bytes allocated for the one or more uplink grant resources;

generating, by the UE, a transport block (TB) based on the uplink grant and the BSR and from data of at least the compressed queue, wherein the TB includes one or more compressed packets and one or more uncompressed packets; and transmitting, by the UE, a Physical Uplink Shared Channel (PUSCH) transmission including the TB during an uplink grant resource of the one or more uplink grant resources.

2. The method of claim 1, wherein the BSR comprises a PUSCH transmission.

3. The method of claim 1, wherein the uplink grant comprises a Physical Downlink Control Channel (PDCCH) transmission.

4. The method of claim 1, wherein the uplink grant comprises a Downlink Control Information (DCI) or Medium Access Control Control Element (MAC CE).

5. The method of claim 1, wherein the BSR indicates a total number of bytes in the compressed queue and the uncompressed queue.

6. The method of claim 1, wherein the compressed queue includes only compressed data, wherein the uncompressed queue includes only uncompressed data, and wherein generating the TB further is based on uncompressed data from the uncompressed queue.

7. The method of claim 1, wherein the BSR indicates a total number of bytes in the compressed queue, wherein the compressed queue includes compressed data and uncompressed data, wherein generating the TB is further based on the uncompressed data from the compressed queue, and wherein the TB is generated independent of data from the uncompressed queue.

8. The method of claim 7, wherein the compressed queue includes a first threshold of compressed data to keep in the compressed queue, and wherein the compressed queue includes a second threshold of uncompressed data to keep in the compressed queue.

9. The method of claim 8, further comprising generating or adjusting the first threshold, the second threshold, or both, based on an estimated time for compression, a maximum physical layer capacity, and history information for previous uplink grants, and wherein the history information for the previous uplink grants includes compression efficiency information, an amount of padding bytes, or a combination thereof.

10. An apparatus for wireless communication, the apparatus comprising:

at least one processor; and a memory coupled to the at least one processor, wherein the at least one processor is configured to:

determine a number of bytes in a compressed queue and a number of bytes in an uncompressed queue;

transmit buffer status report (BSR) indicating at least the number of bytes in the compressed queue;

receive an uplink grant indicating one or more uplink grant resources and a number of bytes allocated for the one or more uplink grant resources;

generate a transport block (TB) based on the uplink grant and the BSR and from data of at least the compressed queue, wherein the TB includes one or more compressed packets and one or more uncompressed packets; and transmit a Physical Uplink Shared Channel (PUSCH) transmission including the TB during an uplink grant resource of the one or more uplink grant resources.

11. The apparatus of claim 10, wherein the BSR includes a bitmap, and wherein the bitmap indicates the number of bytes in the compressed queue and the number of bytes in the uncompressed queue.

12. The apparatus of claim 10, wherein the BSR includes a bitmap, and wherein the bitmap indicates a number of packets in the compressed queue and a number of packets in the uncompressed queue.

13. The apparatus of claim 10, wherein each of the uncompressed bytes are positioned after a last byte of the compressed bytes in the TB.

14. The apparatus of claim 10, wherein the TB does not include any Medium Access Control (MAC) padding bits.

15. The apparatus of claim 10, wherein the number of bytes allotted is greater than the number of bytes in the compressed queue indicated by the BSR, and wherein one or more compressed packets are positioned after the uncompressed packets in the TB.

16. The apparatus of claim 10, wherein the at least one processor is further configured to:

compress a portion of the uncompressed data from the uncompressed queue to generate second compressed data;

move the second compressed data to the compressed queue; and add second uncompressed data to the uncompressed queue.

17. The apparatus of claim 16, wherein compressing the portion of the uncompressed data from the uncompressed queue to generate the second compressed data is performed after the BSR is transmitted and before the uplink grant is received, and wherein the TB further includes the second compressed data.

18. The apparatus of claim 10, wherein the at least one processor is further configured to:

determine an amount of bytes allocated to the uplink grant resource based on the uplink grant;

determine that the number of bytes in the compressed queue is less that the amount of bytes allocated; and determine to include at least a portion of the number of bytes in the uncompressed queue in the TB.

19. The apparatus of claim 10, wherein the number of bytes allocated to the UE in the uplink grant is always more than the total compressed bytes.

20. The apparatus of claim 10, wherein the one or more compressed packets have a compressed profile and include bytes of compressed data, and wherein the one or more uncompressed packets have an uncompressed profile and include bytes of uncompressed data.

21. An apparatus for wireless communication, the apparatus comprising:

means for determining a number of bytes in a compressed queue and a number of bytes in an uncompressed queue;

means for transmitting a buffer status report (BSR) indicating at least the number of bytes in the compressed queue;

means for receiving an uplink grant indicating one or more uplink grant resources and a number of bytes allocated for the one or more uplink grant resources;

means for generating a transport block (TB) based on the uplink grant and the BSR and from data of at least the compressed queue, wherein the TB includes one or more compressed packets and one or more uncompressed packets; and means for transmitting a Physical Uplink Shared Channel (PUSCH) transmission including the TB during an uplink grant resource of the one or more uplink grant resources.

22. The apparatus of claim 21, wherein the apparatus is configured for Robust Header Compression (ROHC), and wherein the TB includes bytes from a radio bearer configured with ROHC.

23. The apparatus of claim 21, wherein the apparatus is configured for Uplink Data Compression (UDC).

24. The apparatus of claim 21, wherein the TB further includes one or more bytes of compressed data which was compressed after the BSR was transmitted and before the uplink grant was received.

25. The apparatus of claim 21, wherein the TB includes some packets sent with an uncompressed profile.

26. A non-transitory, computer-readable medium storing instructions that, when executed by a processor, cause the processor to perform operations comprising:

determining, by a user equipment (UE), a number of bytes in a compressed queue and a number of bytes in an uncompressed queue;

transmitting, by the UE, a buffer status report (BSR) indicating at least the number of bytes in the compressed queue;

receiving, by the UE, an uplink grant indicating one or more uplink grant resources and a number of bytes allocated for the one or more uplink grant resources;

generating, by the UE, a transport block (TB) based on the uplink grant and the BSR and from data of at least the compressed queue, wherein the TB includes one or more compressed packets and one or more uncompressed packets; and transmitting, by the UE, a Physical Uplink Shared Channel (PUSCH) transmission including the TB during an uplink grant resource of the one or more uplink grant resources.

27. The non-transitory, computer-readable medium of claim 26, wherein the TB further includes Medium Access Control (MAC) padding bits.

28. The non-transitory, computer-readable medium of claim 26, wherein the instructions further cause the processor to perform operations comprising:

responsive to determining to switch packet compression modes or receiving packet compression mode information, switching from a first packet compression mode to a second compression mode.

29. The non-transitory, computer-readable medium of claim 28, wherein one of the first packet compression mode or the second packet compression mode is a dual queue BSR reporting mode, and wherein the other of the first packet compression mode or the second packet compression mode is a single queue BSR reporting mode with the single queue configured to store compressed and uncompressed packets.

30. The non-transitory, computer-readable medium of claim 26, wherein the one or more compressed packets have a compressed profile and include bytes of compressed data, and wherein the one or more uncompressed packets have an uncompressed profile and include bytes of uncompressed data.

* * * * *